US012640140B2

(12) United States Patent
Hwang et al.

(10) Patent No.: US 12,640,140 B2
(45) Date of Patent: May 26, 2026

(54) ELECTRONIC APPARATUS AND CONTROLLING METHOD THEREOF

(71) Applicant: Samsung Electronics Co., Ltd., Suwon-si (KR)

(72) Inventors: Dohyeong Hwang, Suwon-si (KR); Okhee Baek, Suwon-si (KR); Jongyeong Shin, Suwon-si (KR); Jeongwon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 218 days.

(21) Appl. No.: 18/183,522

(22) Filed: Mar. 14, 2023

(65) Prior Publication Data

US 2023/0223013 A1    Jul. 13, 2023

Related U.S. Application Data

(63) Continuation of application No. PCT/KR2022/017242, filed on Nov. 4, 2022.

(30) Foreign Application Priority Data

Nov. 10, 2021    (KR) ........................ 10-2021-0154035

(51) Int. Cl.
*G10L 15/16* (2006.01)
*G06F 3/16* (2006.01)
(Continued)

(52) U.S. Cl.
CPC .............. *G10L 15/16* (2013.01); *G06F 3/167* (2013.01); *G10L 15/063* (2013.01); *G10L 15/22* (2013.01);
(Continued)

(58) Field of Classification Search
CPC ......... G06F 3/167; G06N 3/08; G10L 15/063; G10L 15/16; G10L 15/22; G10L 15/26;
(Continued)

(56) References Cited

U.S. PATENT DOCUMENTS

| | | |
|---|---|---|
| 10,418,027 B2 | 9/2019 | Ko et al. |
| 10,699,718 B2 | 6/2020 | Kim et al. |

(Continued)

FOREIGN PATENT DOCUMENTS

| | | |
|---|---|---|
| CN | 109872713 A | 6/2019 |
| KR | 10-2016-0110085 A | 9/2016 |

(Continued)

OTHER PUBLICATIONS

European Search Report dated Oct. 10, 2024, issued in European Application No. 22893120.0.

(Continued)

*Primary Examiner* — Angela A Armstrong
(74) *Attorney, Agent, or Firm* — Jefferson IP Law, LLP

(57) ABSTRACT

An electronic apparatus is provided. The electronic apparatus includes a communication interface with communication circuitry, a memory configured to store at least one instruction and a processor, and the processor is configured to receive a first audio recognized as a wake up word by an external device from the external device, determine whether the first audio corresponds to the wake up word by analyzing the first audio, based on determining that the first audio does not correspond to the wake up word, obtain a neural network model for detecting a wake up word misrecognition based on the first audio, and transmit information regarding the neural network model to the external device.

16 Claims, 9 Drawing Sheets

(51) Int. Cl.

| | |
|---|---|
| *G10L 15/06* | (2013.01) |
| *G10L 15/08* | (2006.01) |
| *G10L 15/22* | (2006.01) |
| *G10L 15/30* | (2013.01) |

(52) U.S. Cl.
CPC ........ *G10L 15/30* (2013.01); *G10L 2015/088* (2013.01); *G10L 2015/223* (2013.01); *G10L 2015/225* (2013.01)

(58) Field of Classification Search
CPC .............. G10L 15/30; G10L 2015/088; G10L 2015/223; G10L 2015/225; G10L 21/02
See application file for complete search history.

(56) References Cited

U.S. PATENT DOCUMENTS

| | | | |
|---|---|---|---|
| 10,748,524 B2 | 8/2020 | Wang et al. | |
| 11,417,327 B2 | 8/2022 | Choi | |
| 11,514,890 B2 | 11/2022 | Lee et al. | |
| 11,557,292 B1 * | 1/2023 | Wang | G10L 15/16 |
| 2018/0102125 A1 * | 4/2018 | Ko | G10L 15/01 |
| 2019/0311719 A1 * | 10/2019 | Adams | G10L 15/30 |
| 2020/0013390 A1 | 1/2020 | Wang et al. | |
| 2020/0027462 A1 | 1/2020 | Wang et al. | |
| 2020/0090647 A1 * | 3/2020 | Kurtz | G06F 3/167 |
| 2020/0125603 A1 | 4/2020 | Ha et al. | |
| 2020/0184966 A1 | 6/2020 | Yavagal | |
| 2021/0151043 A1 | 5/2021 | Lee et al. | |
| 2021/0210075 A1 * | 7/2021 | Kim | G10L 15/183 |
| 2021/0256965 A1 | 8/2021 | Kim et al. | |
| 2021/0295833 A1 | 9/2021 | Rastrow et al. | |
| 2022/0139377 A1 | 5/2022 | Lee et al. | |
| 2022/0189481 A1 | 6/2022 | Ushakov | |

FOREIGN PATENT DOCUMENTS

| | | |
|---|---|---|
| KR | 10-2018-0040426 A | 4/2018 |
| KR | 10-2020-0007530 A | 1/2020 |
| KR | 10-2020-0025226 A | 3/2020 |
| KR | 10-2020-0045851 A | 5/2020 |
| KR | 10-2020-0063521 A | 6/2020 |
| KR | 10-2021-0030160 A | 3/2021 |

OTHER PUBLICATIONS

International Search Report and written opinion dated Feb. 3, 2023, issued in International Application No. PCT/KR2022/017242.

* cited by examiner

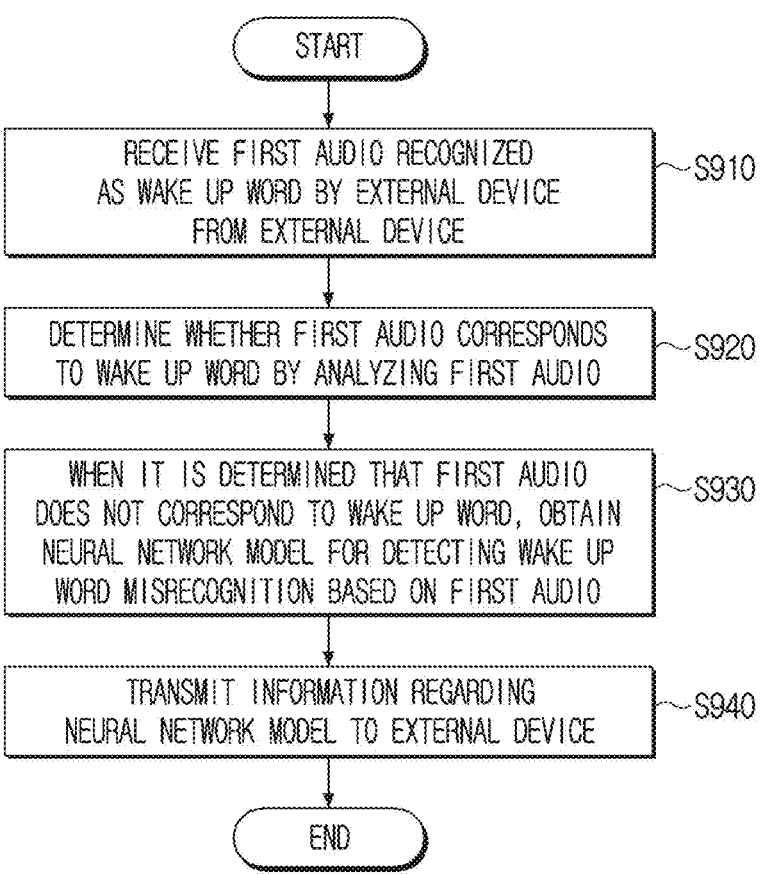

START

RECEIVE FIRST AUDIO RECOGNIZED
AS WAKE UP WORD BY EXTERNAL DEVICE
FROM EXTERNAL DEVICE                                    ~S910

DETERMINE WHETHER FIRST AUDIO CORRESPONDS
TO WAKE UP WORD BY ANALYZING FIRST AUDIO               ~S920

WHEN IT IS DETERMINED THAT FIRST AUDIO
DOES NOT CORRESPOND TO WAKE UP WORD, OBTAIN
NEURAL NETWORK MODEL FOR DETECTING WAKE UP
WORD MISRECOGNITION BASED ON FIRST AUDIO              ~S930

TRANSMIT INFORMATION REGARDING
NEURAL NETWORK MODEL TO EXTERNAL DEVICE               ~S940

END

ELECTRONIC APPARATUS AND CONTROLLING METHOD THEREOF

CROSS-REFERENCE TO RELATED APPLICATION(S)

This application is a continuation application, claiming priority under § 365(c), of an International application No. PCT/KR2022/017242, filed on Nov. 4, 2022, which is based on and claims the benefit of a Korean patent application number 10-2021-0154035, filed on Nov. 10, 2021, in the Korean Intellectual Property Office, the disclosure of which is incorporated by reference herein in its entirety.

1. FIELD

The disclosure relates to an electronic apparatus and a controlling method thereof. More particularly, the disclosure relates to an electronic apparatus for detecting whether a wake up word is incorrectly recognized and a controlling method thereof.

2. DESCRIPTION OF RELATED ART

Recently, an artificial intelligence (AI) system is used in various fields. Unlike the existing rule-based smart system, the artificial intelligence system is a system in which a machine learns, judges and becomes smart by itself. As the artificial intelligence system is used, the recognition rate is improved and users' preference can be understood more accurately and thus, the existing rule-based smart system is gradually being replaced with a deep learning-based artificial intelligence system.

An artificial intelligence technology consists of machine learning (e.g., deep-learning) and element technologies utilizing machine learning. The machine learning is an algorithm technology of classifying and learning features of input data by oneself, and the element technology is a technology of using a machine learning algorithm such as deep learning to perform the functions of a human brain such as cognition, judgement, etc. using a machine learning algorithm, and consists of technical fields such as linguistic understanding, visual understanding, inference/prediction, knowledge representation, a motion control, and the like. In particular, the linguistic understanding is a technology of recognizing human language/text and applying/processing the same, and includes natural language processing, machine translation, interactive system, question and answer, speech recognition/synthesis, and the like.

Recently, various electronic apparatuses support the voice recognition function. The voice recognition operation of an electronic apparatus starts with an operation of recognizing a wake up word (e.g., hi, Bixby). Accordingly, the electronic apparatus in which the voice recognition function is activated must always perform the operation of recognizing a wake up word. This means that resources such as central processing unit (CPU) or memory are always used in the electronic apparatus.

Meanwhile, among electronic apparatuses support the voice recognition function, there may be electronic apparatuses having limited resources such as CPU or memory. Due to the nature of the operation of recognizing a wake up word, which must be performed all the time, it is not easy to mount a high-performance wake up word detection model that requires a lot of resources in such electronic apparatuses. For this reason, some electronic apparatuses supporting the voice recognition function are inevitably equipped with a wake up word detection model having limited performance and thus, a wake up word misrecognition may occur.

Accordingly, there is a need for a technology for preventing a wake up word misrecognition using limited resources.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a technical task to be resolved by the disclosure for detecting a wake up word misrecognition of an external device.

Another aspect of the disclosure is to provide a technical task to be resolved by the disclosure for preventing a wake up word misrecognition of an external device.

Additional aspects will be set forth in part in the description which follows and, in part, will be apparent from the description, or may be learned by practice of the presented embodiments.

In accordance with an aspect of the disclosure, an electronic apparatus is provided. The electronic apparatus includes a communication interface with communication circuitry, a memory configured to store at least one instruction and a processor, and the processor is configured to receive a first audio recognized as a wake up word by an external device from the external device, determine whether the first audio corresponds to the wake up word by analyzing the first audio, based on determining that the first audio does not correspond to the wake up word, obtain a neural network model for detecting a wake up word misrecognition based on the first audio, and transmit information regarding the neural network model to the external device.

The processor may be configured to, based on a text corresponding to the first audio not being detected, determine that the first audio does not correspond to the wake up word.

The processor may be configured to obtain a text corresponding to the first audio, and based on a similarity between the text corresponding to the first audio and the wake up word being less than a predetermined value, determine that the first audio does not correspond to the wake up word.

The processor may be configured to receive a second audio subsequent to the first audio from the external device, and determine whether the first audio corresponds to the wake up word by analyzing the second audio.

The processor may be configured to obtain a text corresponding to the second audio, and based on the text corresponding to the second audio not having a predetermined sentence structure, determine that the first audio does not correspond to the wake up word.

The second audio may include a user voice regarding an operation performed as the external device recognizes the first audio as the wake up word, and the processor may be configured to determine whether the first audio corresponds to the wake up word by analyzing the user voice.

The processor may be configured to determine whether the first audio corresponds to the wake up word based on a user feedback input through a user interface (UI) provided by the external device.

The processor may be configured to, based on determining that the first audio does not correspond to the wake up word, store the first audio in the memory, identify a plurality of audios forming a cluster from among the first audio stored in the memory, and train the neural network model based on the plurality of third audios.

In accordance with another aspect of the disclosure, a controlling method of an electronic apparatus is provided. The controlling method includes receiving a first audio recognized as a wake up word by an external device from the external device, determining whether the first audio corresponds to the wake up word by analyzing the first audio, based on determining that the first audio does not correspond to the wake up word, obtaining a neural network model for detecting a wake up word misrecognition based on the first audio, and transmitting information regarding the neural network model to the external device.

The determining whether the first audio corresponds to the wake up word may include, based on a text corresponding to the first audio not being detected, determining that the first audio does not correspond to the wake up word.

The determining whether the first audio corresponds to the wake up word may include obtaining a text corresponding to the first audio, and based on a similarity between the text corresponding to the first audio and the wake up word being less than a predetermined value, determining that the first audio does not correspond to the wake up word.

The method may further include receiving a second audio subsequent to the first audio from the external device, and the determining whether the first audio corresponds to the wake up word may include determining whether the first audio corresponds to the wake up word by analyzing the second audio.

The determining whether the first audio corresponds to the wake up word may include obtaining a text corresponding to the second audio, and based on the text corresponding to the second audio not having a predetermined sentence structure, determining that the first audio does not correspond to the wake up word.

The second audio may include a user voice regarding an operation performed as the external device recognizes the first audio as the wake up word, and the determining whether the first audio corresponds to the wake up word may include determining whether the first audio corresponds to the wake up word by analyzing the user voice.

The determining whether the first audio corresponds to the wake up word may include determining whether the first audio corresponds to the wake up word based on a user feedback input through a user interface (UI) provided by the external device.

The obtaining a neural network model may include, based on determining that the first audio does not correspond to the wake up word, storing the first audio in the memory, identifying a plurality of third audios forming a cluster from among the first audio stored in the memory, and training the neural network model based on the plurality of third audios.

The means to solve the task according to an embodiment are not limited to the above-described means, and means that are not mentioned above can be clearly understood by those of ordinary skill in the art to which the disclosure belongs based on the present specification and the accompanying drawings.

According to the above-described various embodiments, an electronic apparatus may detect a wake up word misrecognition of an external device. In addition, the electronic apparatus may prevent a wake up word misrecognition of the external device. Accordingly, user convenience can be improved.

In addition, the effects that can be obtained or predicted by the embodiments of the disclosure are directly or implicitly disclosed in the detailed description of the embodiments of the disclosure. For example, various effects predicted according to an embodiment of the disclosure will be disclosed in the detailed description that will be provided later.

Other aspects, advantages and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 9 is a flowchart illustrating a controlling method of an electronic apparatus according to an embodiment of the disclosure.

Throughout the drawings, it should be noted that like reference numbers are used to depict the same or similar elements, features, and structures.

DETAILED DESCRIPTION

Figure 1:
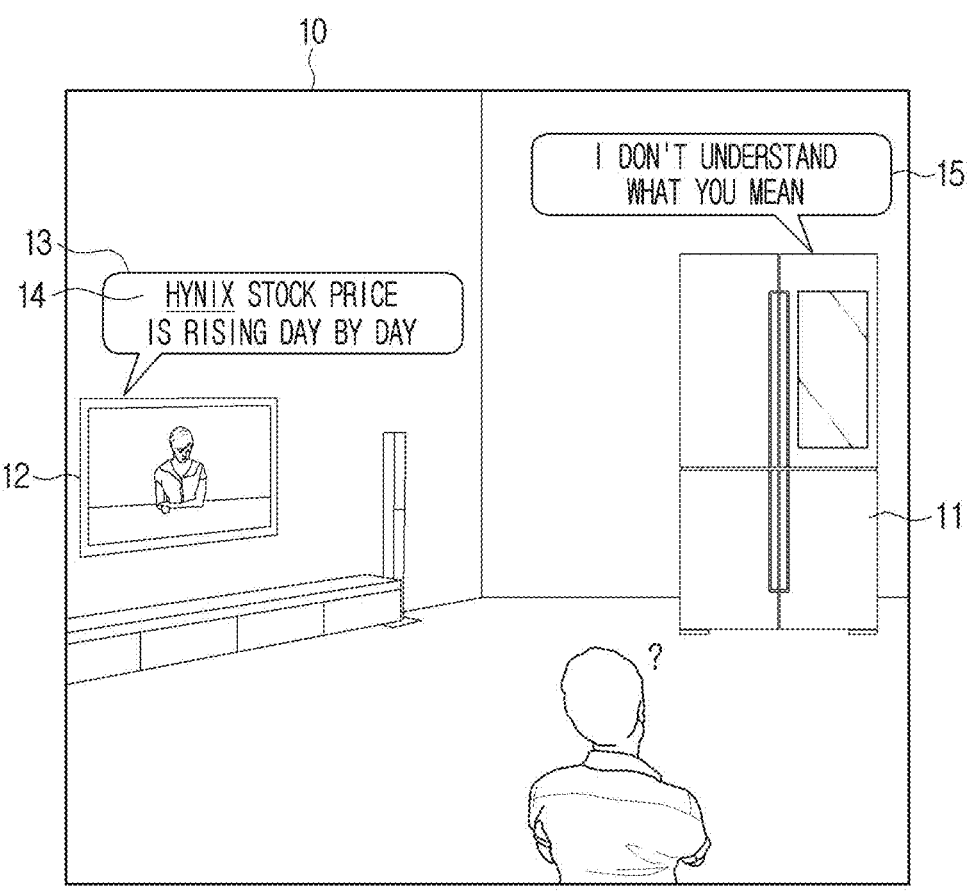
FIG. 1 is a view provided to explain a situation in which a wake up word is misrecognized according to an embodiment of the disclosure.

The following description, with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

General terms that are currently widely used were selected as terms used in embodiments of the disclosure in consideration of functions in the disclosure, but may be changed depending on the intention of those skilled in the art or a judicial precedent, the emergence of a new technique, and the like. In addition, in a specific case, terms arbitrarily chosen by an applicant may exist. In this case, the meanings of such terms are mentioned in detail in corresponding description portions of the disclosure. Therefore, the terms used in embodiments of the disclosure should be defined on the basis of the meanings of the terms and the contents throughout the disclosure rather than simple names of the terms.

The disclosure may be variously modified and have several embodiments, and specific embodiments of the disclosure are thus illustrated in the drawings and described in detail in the detailed description. However, it is to be understood that the disclosure is not limited to specific embodiments, but includes all modifications, equivalents, and substitutions without departing from the scope and spirit of the disclosure. In case that it is decided that the detailed description of the known art related to the disclosure may obscure the gist of the disclosure, a detailed description thereof will be omitted.

Terms 'first', 'second', and the like, may be used to describe various components, but the components are not to be construed as being limited by these terms. The terms are used only to distinguish one component from another component.

It is to be understood that a term 'include' or 'formed of' used in the specification specifies the presence of features, numerals, steps, operations, components, parts or combinations thereof, which is mentioned in the specification, and does not preclude the presence or addition of one or more other features, numerals, steps, operations, components, parts or combinations thereof.

Hereinafter, embodiments of the disclosure will be described in detail with reference to the accompanying drawings so that those skilled in the art to which the disclosure pertains may easily practice the disclosure. However, the disclosure may be modified in various different forms, and is not limited to embodiments provided in the present specification. In addition, in the drawings, portions unrelated to the description are omitted to clearly describe the disclosure, and similar portions are denoted by similar reference numerals throughout the specification.

FIG. 1 is a view provided to explain a situation in which a wake up word is misrecognized according to an embodiment of the disclosure.

Referring to FIG. 1, a refrigerator 11 and a television (TV) 12 capable of performing a voice recognition function may exist in a home 10. A user 1 may be watching a video content (e.g., news) output from the TV 12 at home. In this case, an audio 13 of the image content output from the TV 12 may include a word 14 having a similar pronunciation to a wake up word (e.g., hi, Bixby). The refrigerator 11 may recognize the word 14 as a wake up word and output a voice message 15. In other words, the refrigerator 11 may misrecognize the word 14 as a wake up word. In this case, the user 1 may feel inconvenience. The disclosure provides a solution to resolve such a problem and hereinafter, a voice recognition system according to an embodiment will be described.

Figure 2:
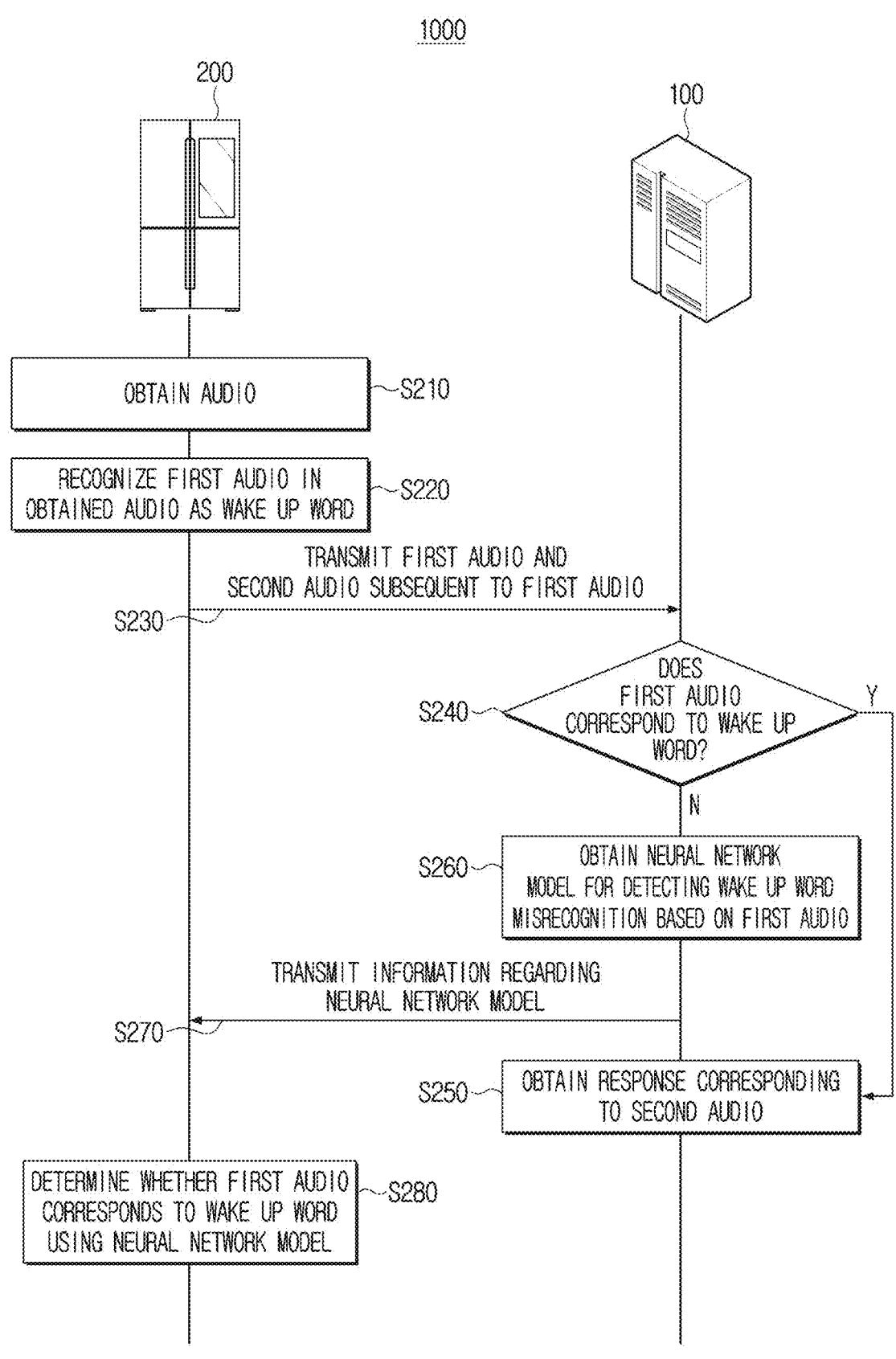
FIG. 2 is a flowchart provided to explain a voice recognition system according to an embodiment of the disclosure.

FIG. 2 is a flowchart provided to explain a voice recognition system according to an embodiment of the disclosure.

Referring to FIG. 2, a voice recognition system 1000 may include an electronic apparatus 100 and an external device 200. For example, the electronic apparatus 100 may be a server, and the external device 200 may be a refrigerator. However, this is only an example, and the external device 200 may be any device capable of recognizing a wake up word.

The external device 200 may obtain a predetermined audio at operation S210. The external device 200 may recognize first audio from obtained audio as a wake up word at operation S220. For example, the first audio may correspond to the word 14 of FIG. 1. The audio obtained by the external device 200 may include second audio subsequent to the first audio. For example, the second audio may include an audio output from a content output device and a user voice. When the wake up word is recognized, the external device 200 may transmit the first audio and the second audio subsequent to the first audio to the electronic apparatus 100 at operation S230.

The electronic apparatus 100 may determine whether the first audio corresponds to the wake up word at operation S240. The electronic apparatus 100 may determine whether the first audio corresponds to the wake up word by analyzing at least one of the first audio or the second audio. For example, if a similarity between a text corresponding to the first audio and the wake up word is less than a predetermined value, the electronic apparatus 100 may determine that the first audio does not correspond to the wake up word. On the other hand, if a similarity between a text corresponding to the first audio and the wake up word is equal to or greater than the predetermined value, the electronic apparatus 100 may determine that the first audio corresponds to the wake up word. However, this is only an example, and the electronic apparatus 100 may determine whether the first audio corresponds to the wake up word in various methods.

When the first audio corresponds to the wake up word at operation S240-Y, the electronic apparatus 100 may obtain a response corresponding to the second audio at operation S250. Subsequently, the electronic apparatus 100 may transmit information regarding the obtained response to the external device 200. When the first audio does not correspond to the wake up word at operation S240-N, the electronic apparatus 100 may obtain a neural network model for detecting a wake up word misrecognition based on the first audio at operation S260. The neural network model for detecting a wake up word misrecognition may be an artificial intelligence model trained to identify an audio that is likely to be misrecognized as a wake up word by the external device 200. The electronic apparatus 100 may store the first audio in a memory and identify a plurality of third audios forming a cluster among the first audio stored in the memory. The electronic apparatus 100 may train a neural network model to identify an audio having a similarity with the plurality of third audios equal to or greater than a predetermined value. Meanwhile, when a plurality of audios form a cluster, it means that there are a predetermined number or more of feature values corresponding to the plurality of audios within a predetermined range.

The electronic apparatus 100 may transmit information regarding a neural network model to the external device 200 at operation S270. The external device 200 may determine whether the first audio corresponds to a wake up word using the neural network model at operation S280. For example, the external device 200 may identify whether the first audio corresponds to the wake up word by inputting the first audio to the trained neural network model.

Meanwhile, it is described in S230 that the external device 200 transmits the first audio and the second audio to the electronic apparatus 100, but this is only an example. The external device 200 may obtain a first feature value corresponding to the first audio and a second feature value corresponding to the second audio, and may transmit the first feature value and the second feature value to the electronic apparatus 100. In this case, the electronic apparatus 100 may determine whether the first word corresponds to the wake up word by analyzing at least one of the first feature value or the second feature value. For example, the electronic apparatus 100 may obtain a similarity between the first feature value and a third feature value by comparing the first feature value and the third feature value corresponding to the wake up word. When a similarity between the first feature value and the third feature value is equal to or greater than a predetermined value, the electronic apparatus 100 may determine that the first audio corresponds to the wake up word. When a similarity between the first feature value and the third feature value is less than the predetermined value, the electronic apparatus 100 may determine that the first audio does not correspond to the wake up word.

In addition, it is described in operation S260 that the electronic apparatus 100 may obtain a neural network model based on the first audio, but this is only an example. The electronic apparatus 100 may obtain a neural network model based on the first feature value corresponding to the first audio. For example, the electronic apparatus 100 may identify a plurality of feature values forming a cluster among the first feature value. The electronic apparatus 100 may train a neural network model to identify a feature value of which similarity with the plurality of third feature values is equal to or greater than a predetermined value. In this case, the external device 200 may obtain the first feature value corresponding to the first audio, and identify whether the first audio corresponds to a wake up word by inputting the first feature value to the neural network model.

Figure 3:
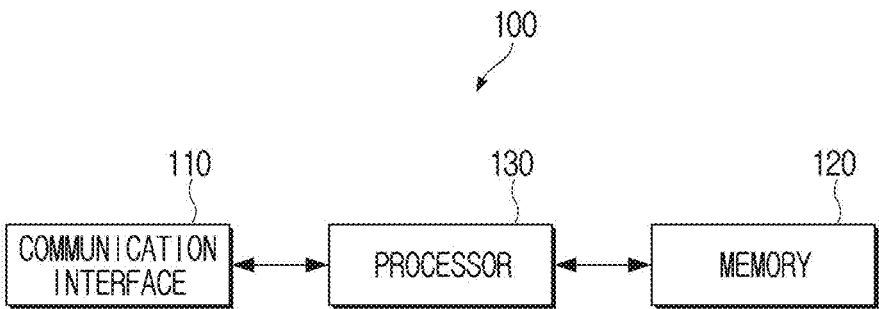
FIG. 3 is a block diagram illustrating configuration of an electronic apparatus according to an embodiment of the disclosure.

FIG. 3 is a block diagram illustrating configuration of an electronic apparatus according to an embodiment of the disclosure.

Referring to FIG. 3, the electronic apparatus 100 may include a communication interface 110, a memory 120 and a processor 130. For example, the electronic apparatus 100 may be a server, but is not limited thereto. The electronic apparatus 100 may be a user terminal or a personal computer (PC).

The communication interface 110 includes at least one communication circuitry and may perform communication with various types of external devices or external servers. For example, the communication interface 110 may receive an audio or a feature value corresponding to the audio from the external device 200. Alternatively, the communication interface 110 may transmit information regarding a neural network model to the external device 200. Meanwhile, the communication interface 110 may include at least one of a Wi-Fi communication module, a cellular communication module, a 3rd Generation (3G) mobile communication module, a 4th Generation (4G) mobile communication module, a 4th Generation Long Term Evolution (LTE) communication module, or a 5th Generation (5G) mobile communication module.

The memory 120 may store an operating system (OS) for controlling the overall operations of the components of the electronic apparatus 100 and commands or data related to the components of the electronic apparatus 100. For example, the electronic apparatus 100 may store information regarding an audio that is misrecognized as a wake up word by the external device 200. The information regarding an audio may include the audio or a feature value corresponding to the audio. In addition, the memory 120 may store a neural network model for detecting an audio that is misrecognized as a wake up word.

The memory 120 may store a voice recognition model. The voice recognition model may include an Automatic Speech Recognition (ASR) module, a Natural Language Understanding (NLU) module, a Dialogue Manager (DM) module, a Natural Language Generator (NLG) module, and a Text To Speech (TTS) module. Meanwhile, the memory 120 may be implemented as a non-volatile memory (e.g., a hard disk, a Solid state drive (SSD), a flash memory), a volatile memory and the like.

The processor 130 may be electrically connected to the memory 120 and control the overall functions and operations of the electronic apparatus 100. The processor 130 may receive the first audio that is recognized as a wake up word by an external device from the external device. The processor 130 may determine whether the first audio corresponds to the wake up word by analyzing the first audio.

The processor 130 may identify whether a text corresponding to the first audio is detected by inputting the first audio to the ASR module. When the text corresponding to the first audio is not detected, the processor 130 may determine that the first audio does not correspond to the wake up word.

The processor 130 may obtain the text corresponding to the first audio. When a similarity between the text corresponding to the first audio and the wake up word is less than a predetermined value, the processor 130 may determine that the first audio does not correspond to the wake up word.

The processor 130 may receive the second audio which is subsequent to the first audio from the external device and determine whether the first audio corresponds to the wake up word by analyzing the second audio. For example, if the text corresponding to the second audio does not have a predetermined sentence structure, the processor 130 may determine that the first audio does not correspond to the wake up word. The predetermined sentence structure means an arrangement structure of words or phrases in one sentence and it may be pre-stored in the memory 120.

The second audio may include a user voice regarding an operation that is performed as the external device recognizes the first audio as the wake up word. For example, the external device may recognize the first audio as the wake up word and output a voice message (e.g., "I am listening"). Alternatively, the external device may output a response (e.g., "I don't understand what you mean") to the second audio that is subsequent to the first audio. In this case, the user may utter a voice (e.g., "why is this happening?") indicating a malfunction of the external device. The processor 130 may determine whether the first audio corresponds to the wake up word by analyzing the user voice. The processor 130 may determine whether the first audio corresponds to the wake up word by analyzing the user voice using a natural language understanding module.

The processor 130 may determine whether the first audio corresponds to the wake up word based on a user feedback input through a user interface (UI) provided by an external device. For example, the external device may display a UI element for inactivating a voice recognition function of the external device. In addition, the external device may obtain a user command for selecting the displayed UI element. In this case, the processor 130 may receive a control signal corresponding to the user command from the external device.

When it is determined that the first audio does not correspond to the wake up word, the processor 130 may obtain a neural network model for detecting a wake up word misrecognition based on the first audio. The processor 130 may store a plurality of first audios determined not to correspond to the wake up word, in the memory 120. The processor 130 may identify a plurality of third audios forming a cluster from among the plurality of first audios stored in the memory 120. For example, a plurality of feature values corresponding to the plurality of third audios, respectively, may be included in a predetermined range. The processor 130 may train a neural network model based on the plurality of third audios.

The processor 130 may control the communication interface 110 to transmit information regarding the neural network model to the external device. The information regarding the neural network model may include various data (e.g., parameters) regarding the neural network model or a message requesting to download the neural network model.

Meanwhile, the function related to artificial intelligence according to an embodiment is operated through the processor 130 and the memory 120. The processor 130 may include one or more processors. In this case, one or more processors may be a general-purpose processor such as a central processing unit (CPU), an Application Processor (AP), a Digital Signal Processor (DSP), etc., a graphics-only processor such as a Graphics Processing Unit (GPU) and a Vision Processing Unit (VPU), or an AI-only processor such as a neural processing unit (NPU). One or more processors control to process input data according to a predefined operation rule or an artificial intelligence model stored in the memory 120. Alternatively, when one or more processors are AI-only processors, the AI-only processors may be designed with a hardware structure specialized for processing a specific artificial intelligence model.

The predefined operation rule or the artificial intelligence model is characterized by being created through learning. Here, being created through learning means creating a predefined operation rule or an artificial intelligence model that is set to perform a desired characteristic (or purpose) as a basic artificial intelligence model is trained by a learning algorithm using a plurality of learning data. Such learning may be conducted in an apparatus itself where artificial intelligence according to an embodiment is performed, or may be conducted through a separate server and/or system. The examples of the learning algorithm include supervised learning, unsupervised learning, semi-supervised learning or reinforcement learning, but are not limited thereto.

The artificial intelligence model may be composed of a plurality of neural network layers. Each of the plurality of neural network layers has a plurality of weight values, and performs a neural network operation through operation between a result of operation of the previous layer and the plurality of weight values. The plurality of weight values of the plurality of neural network layers may be optimized by a learning result of the artificial intelligence model. For example, the plurality of weight values may be updated so that a loss value or a cost value obtained from the artificial intelligence model during the learning process is reduced or minimized. The artificial intelligence model may be processed by an AI-only processor designed in a hardware structure specialized for processing of an artificial intelligence model. The artificial intelligence model may be created through learning.

The artificial neural network may include a Deep Neural Network (DNN) and for example, may be a Convolutional Neural Network (CNN), a Deep Neural Network (DNN), a Recurrent Neural Network (RNN), a Generative Adversarial Network (GAN), a Restricted Boltzmann Machine (RBM), a Deep Belief Network (DBN), a Bidirectional Recurrent Deep Neural Network (BRDNN), or a Deep Q-Networks, etc. However, the artificial neural network is not limited to the above-mentioned examples.

Meanwhile, the electronic apparatus 100 may include an adaptive echo canceller (AEC) module for preprocessing a user voice, a noise suppression (NS) module, an end-point detection (EPD) module, or an automatic gain control (AGC) module. In addition, the electronic apparatus 100 may change an analog voice signal to a digital signal, or may include a digital signal processor (DSP) that changes a stored digital image or digital voice signal to an analog signal.

Figure 4:
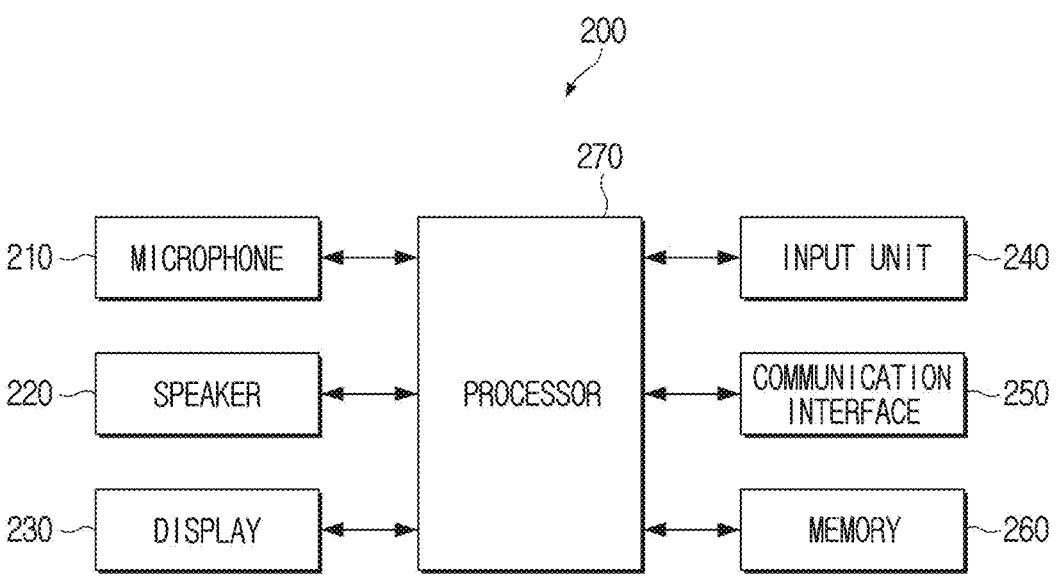
FIG. 4 is a block diagram illustrating configuration of an external device according to an embodiment of the disclosure.

FIG. 4 is a block diagram illustrating configuration of an external device according to an embodiment of the disclosure.

Referring to FIG. 4, the external device 200 may include a microphone 210, a speaker 220, a display 230, an input unit 240, a communication interface 250, a memory 260, and a processor 270. Meanwhile, the communication interface 250, the memory 260 and the processor 270 may correspond to the communication interface 110, the memory 120 and the processor 130 described in FIG. 2, respectively and thus, overlapping descriptions will be omitted.

The microphone 210 may obtain an audio around the external device 200. For example, the microphone 210 may obtain a user voice including a wake up word and a user command. The processor 270 may control the external device 200 based on a user voice obtained through the microphone 210. For example, when a wake up word is recognized in a user voice, the processor 270 may control the communication interface 250 to transmit a first audio and a second audio subsequent to the first audio to the electronic apparatus 100.

The speaker 220 may output a voice message. For example, the speaker 220 may output a voice message corresponding to a user command.

The display 230 may display various screens under the control of the processor 270. For example, the display 230 may display a standby screen. The standby screen means a screen including brief information, and may include current time information, date information and weather information. In addition, the display 230 may display various UI elements for interaction with the user. For example, the display 230 may output a message ("I am listening") indicating that a wake up word is recognized. In addition, the display 230 may display a UI element for inactivating a voice recognition function of the external device 200.

Meanwhile, the display 230 may be liquid crystal display (LCD), light-emitting diode (LED) display, organic light-emitting diode (OLED) display (e.g., active-matrix organic light-emitting diode (AMOLED), passive-matrix OLED (PMOLED)), or microelectromechanical systems (MEMS) display.

The input unit 240 is configured to receive a user command. For example, when determining that the external device 200 misrecognizes a wake up word, the user may input a command for inactivating the voice recognition function to the input unit 240. The input unit 240 may include one or more buttons. When the display 230 is implemented as a touch pad or a touch panel, the display 230 may be considered to be included in the input unit 240 in that it receives a user command in the form of a touch.

The communication interface 250 may transmit the first audio that is recognized as a wake up word and the second audio subsequent to the first audio to the electronic apparatus 100. Alternatively, the communication interface 250 may transmit a first feature value corresponding to the first audio and a second feature value corresponding to the second audio to the electronic apparatus 100. The communication interface 250 may receive information regarding a neural network model for detecting a wake up word misrecognition from the electronic apparatus 100.

The memory 260 may store a wake up engine for detecting a wake up word. The processor 270 may identify whether a wake up word exists in an audio obtained through the microphone using the wake up engine. For example, the processor 270 may determine that the first audio corresponds to the wake up word. In this case, the processor 270 may control the communication interface 250 to transmit the first audio and the second audio subsequent to the first audio to the electronic apparatus 100.

Meanwhile, the wake up engine may misrecognize the first audio as the wake up word. To solve this problem, the processor 270 may determine whether there is a wake up word misrecognition using a neural network model received from the electronic apparatus 100. For example, when the first audio is recognized as the wake up word through the wake up engine, the processor 270 may identify whether the first audio is misrecognized as the wake up word by inputting information regarding the first audio to the neural network model. The processor 270 may input the first audio or the first feature value corresponding to the first audio to the neural network model.

When it is determined that the first audio is misrecognized as the wake up word by the wake up engine, the processor 270 may not transmit the first audio and the second audio subsequent to the first audio to the electronic apparatus 100. On the other hand, when it is not determined that the first audio is misrecognized as the wake up word by the wake up engine, the processor 270 may control the communication interface 250 to transmit the first audio and the second audio to the electronic apparatus 100. In addition, the processor 270 may receive a response message corresponding to the second audio from the electronic apparatus 100 and output the response message.

Figure 5:
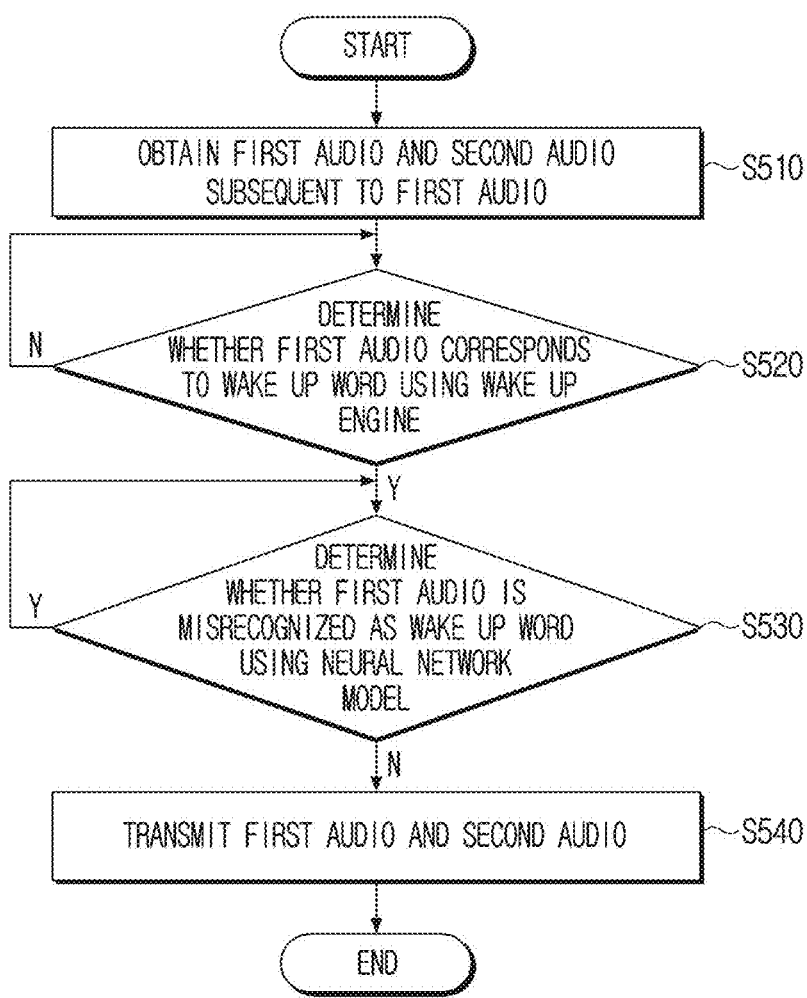
FIG. 5 is a flowchart provided to explain an operation of an external device according to an embodiment of the disclosure.

FIG. 5 is a flowchart provided to explain an operation of an external device according to an embodiment of the disclosure.

Referring to FIG. 5, the external device 200 may obtain the first audio and the second audio subsequent to the first audio at operation S510. The external device 200 may determine whether the first audio corresponds to the wake up word using the wake up engine at operation S520. When it is determined that the first audio corresponds to the wake up word at operation S520-Y, the external device 200 may determine whether the first audio is misrecognized as the wake up word using the neural network model at operation S530. When it is not determined that the first audio is misrecognized as the wake up word at operation S530-N, the external device 200 may transmit the first audio and the second audio to the electronic apparatus 100 at operation S540. When it is not determined that the first audio corresponds to the wake up word at operation S520-N or when it is determined that the first audio is misrecognized as the wake up word at operation S530-Y, the external device 200 may not transmit the first audio and the second audio to the electronic apparatus 100.

Meanwhile, in FIG. 5, operations S520 and S530 are described separately, but operations S520 and S530 may be integrated. For example, the external device 200 may determine whether the first audio corresponds to the wake up word by determining whether the first audio corresponds to a misrecognition word using the neural network model. Here, the misrecognition word refers to a word with a probability of being misrecognized by the wake up engine being equal to or greater than a predetermined value. When it is determined that the first audio corresponds to the misrecognition word, the external device 200 may determine that the first audio does not correspond to the wake up word. When it is determined that the first audio does not correspond to the misrecognition word, the external device 200 may determine that the first audio corresponds to the wake up word.

Figure 6:
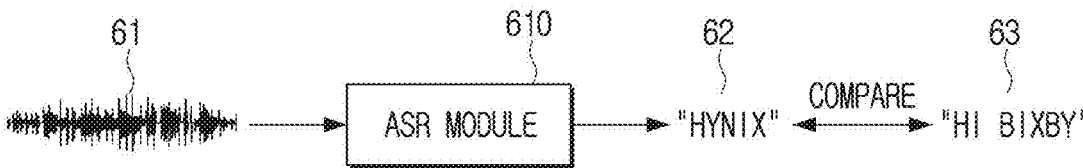
FIG. 6 is a view provided to explain a method of determining whether there is a wake up word misrecognition according to an embodiment of the disclosure.

FIG. 6 is a view provided to explain a method of determining whether there is a wake up word misrecognition according to an embodiment of the disclosure.

Referring to FIG. 6, the electronic apparatus 100 may receive a first audio 61 from the external device 200. The first audio 61 may be an audio determined to correspond to a predetermined wake up word 63 by the external device 200. The electronic apparatus 100 may obtain a text 62 corresponding to the first audio 61 by inputting the received first audio 61 to an ASR module 610. The electronic apparatus 100 may determine a similarity between the obtained text 62 and the predetermined wake up word 63. When the similarity is equal to or greater than a predetermined value, the electronic apparatus 100 may determine that the first audio 61 corresponds to the wake up word 63. In other words, the electronic apparatus 100 may determine that the external device 200's recognition of the first audio 61 as the wake up word is a correct recognition. On the other hand, when the similarity is less than the predetermined value, the electronic apparatus 100 may determine that the first audio 61 does not correspond to the wake up word 63. In other words, the electronic apparatus 100 may determine that the external device 200's recognition of the first audio 61 as the wake up word is a misrecognition.

Meanwhile, when the text 62 is not obtained by inputting the first audio 61 to the ASR module 610, the electronic apparatus 100 may determine that the first audio 61 does not correspond to the wake up word 63. In other words, the electronic apparatus 100 may determine that the external device 200's recognition of the first audio 61 as the wake up word is a misrecognition. For example, when the first audio 61 is a cry of an animal or a machine sound, the wake up text 62 corresponding to the first audio 61 may not be obtained.

Figure 7:
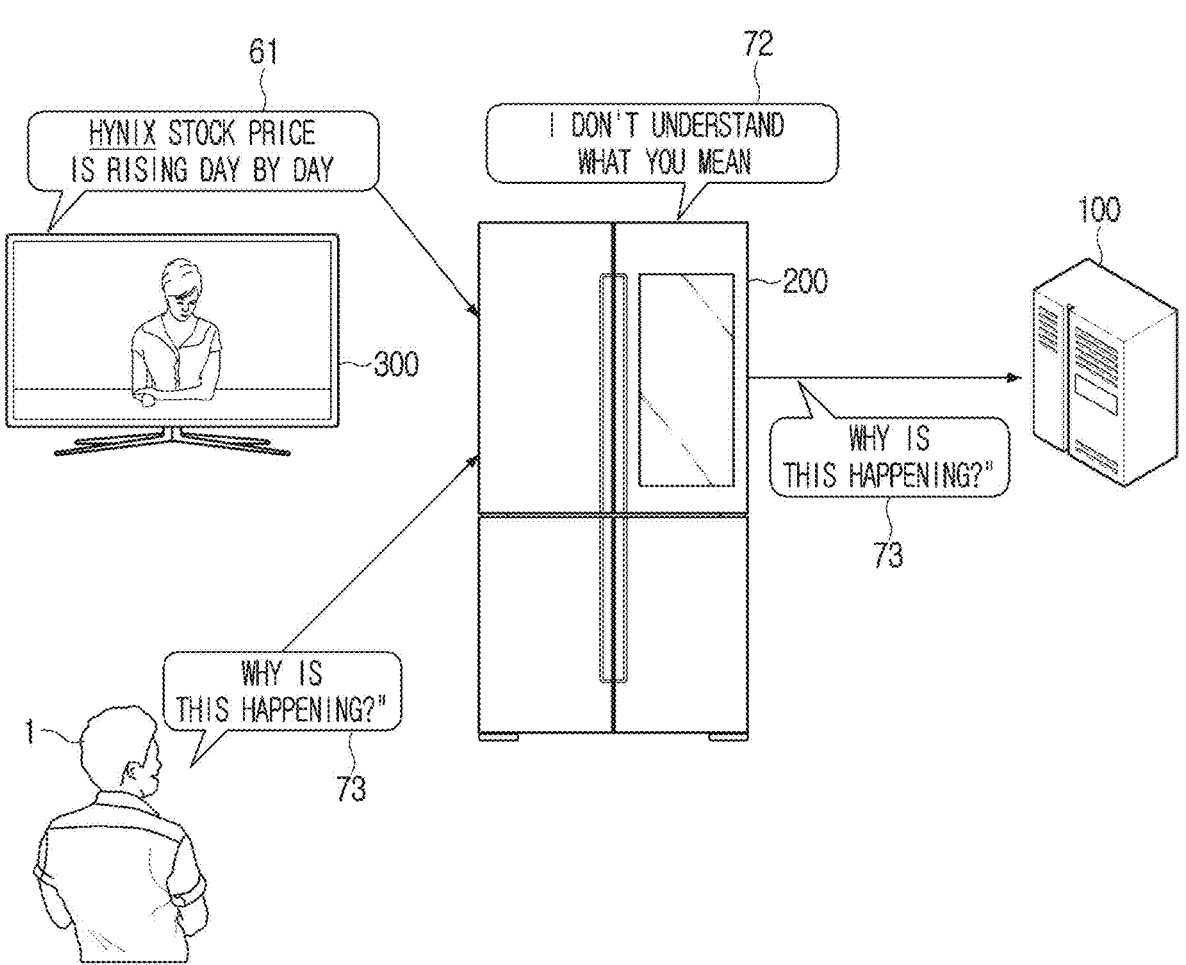
FIG. 7 is a view provided to explain a method of determining whether there is a wake up word misrecognition according to an embodiment of the disclosure.

FIG. 7 is a view provided to explain a method of determining whether there is a wake up word misrecognition according to an embodiment of the disclosure.

Referring to FIG. 7, the external device 200 may obtain the first audio 61 that is output by another external device 300. The external device 200 may recognize a keyword ("hynix") included in the first audio 61 as a wake up word. Subsequently, the external device 200 may output a response message 72 corresponding to the first audio 61. Accordingly, a user 1 may utter a voice 73 questioning the response message 72. The external device 200 may obtain the voice 73 and transmit the same to the electronic apparatus 100.

The electronic apparatus 100 may determine whether the external device 200's recognition of the keyword ("hynix") as the wake up word is a misrecognition by analyzing the voice 73 uttered by the user 1. The electronic apparatus 100 may determine whether the external device 200's recognition of the keyword ("hynix") as the wake up word is a misrecognition using an NLU module. Alternatively, the electronic apparatus 100 may determine whether the external device 200's recognition of the keyword ("hynix") as the wake up word is a misrecognition based on a similarity between the voice 73 and a predetermined voice. Here, the predetermined voice is a voice related to the user's negative reaction, and may be pre-stored in the electronic apparatus 100. For example, if the similarity between the voice 73 and the predetermined voice is equal to or greater than a predetermined value, the electronic apparatus 100 may determine that the external device 200's recognition of the keyword ("hynix") as the wake up word is a misrecognition.

Figure 8:
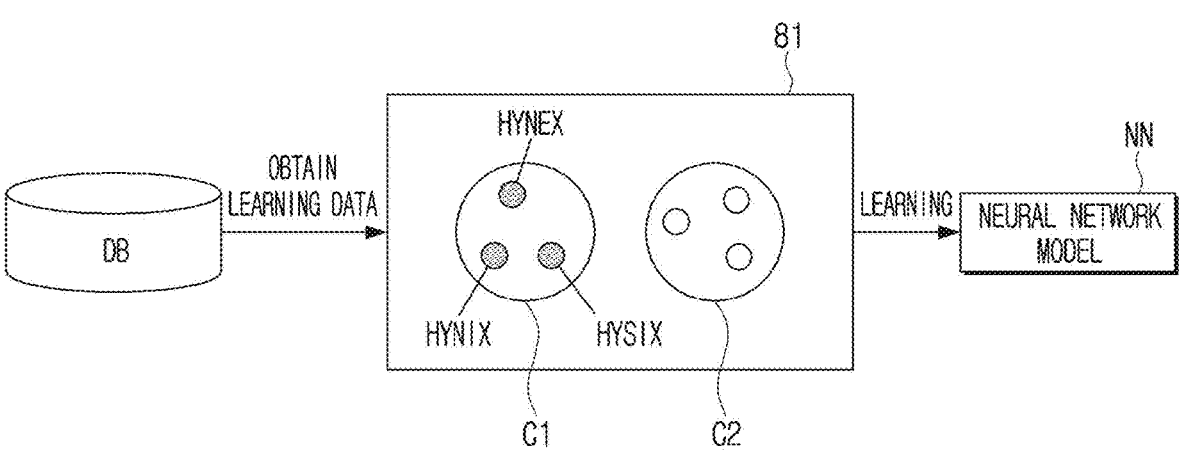
FIG. 8 is a view provided to explain a learning method of a neural network model according to an embodiment of the disclosure.

FIG. 8 is a view provided to explain a learning method of a neural network model according to an embodiment of the disclosure.

Referring to FIG. 8, the electronic apparatus 100 may obtain learning data from database (DB). The DB may store information regarding a plurality of audios misrecognized by the external device 200 as the wake up word. For example, the plurality of audios may include the first audio ("hynix"), the second audio ("hynex") and the third audio ("hysix"). The information regarding the audios may include audio signals corresponding to the audios and feature values corresponding to the audios.

The electronic apparatus 100 may obtain leaning data 81 among information regarding the plurality of audios stored in the DB. The learning data 81 may include information regarding audios forming a cluster among information regarding the plurality of audios. For example, the learning data 81 may include information regarding the first audio ("hynix"), the second audio ("hynex") and the third audio ("hysix") which form the first cluster (C1). In addition, the learning data 81 may include information regarding a plurality of audios forming the second cluster (C2).

The electronic apparatus 100 may train a neural network model (NN) based on the learning data 81. For example, the electronic apparatus 100 may train the neural network model (NN) to output an identification value corresponding to a cluster to which an input audio belongs based on information regarding the input audio. Alternatively, the electronic apparatus 100 may train the neural network model (NN) to output whether the input audio corresponds to the wake up word (e.g., output '0' when corresponding, and output '1' when not corresponding) based on the information regarding the input audio. However, this is only an example, and the electronic apparatus 100 may train the neural network model (NN) in various methods based on the learning data 81.

FIG. 9 is a flowchart illustrating a controlling method of an electronic apparatus according to an embodiment of the disclosure.

Referring to FIG. 9, the electronic apparatus 100 may receive the first audio recognized as the wake up word by the external device from the external device at operation S910.

The electronic apparatus 100 may determine whether the first audio corresponds to the wake up word by analyzing the first audio at operation S920. For example, when a text corresponding to the first audio is not detected, the electronic apparatus 100 may determine that the first audio does not correspond to the wake up word. In another example, when a similarity between the text corresponding to the first audio and the wake up word is less than a predetermined value, the electronic apparatus 100 may determine that the first audio does not correspond to the wake up word. In another example, when a text corresponding to the second audio subsequent to the first audio does not have a predetermined sentence structure, the electronic apparatus 100 may determine that the first audio does not correspond to the wake up word. In another example, the electronic apparatus 100 may determine whether the first audio corresponds to the wake up word by analyzing a user voice regarding an operation performed as the external device recognizes the first audio as the wake up word. In another example, the electronic apparatus 100 may determine whether the first audio corresponds to the wake up word based on a user feedback input through a UI provided by the external device.

If it is determined that the first audio does not correspond to the wake up word, the electronic apparatus 100 may obtain a neural network model for detecting a wake up word misrecognition based on the first audio at operation S930. The electronic apparatus 100 may identify a plurality of third audios forming a cluster from among a plurality of first audios. The electronic apparatus 100 may train the neural network model based on the identified plurality of third audios. In addition, the electronic apparatus 100 may transmit information regarding the neural network model to the external device at operation S940.

Meanwhile, the above-described various embodiments may be implemented in a recording medium that can be read by a computer or a similar device using software, hardware, or a combination of software and hardware. In some cases, the embodiments described in the disclosure may be implemented by the processor itself. When implemented as software, the embodiments such as procedures and functions described in the specification may be implemented by separate software modules. Each of the software modules may perform one or more functions and operations described in the specification.

Meanwhile, computer instructions for performing processing operations according to the diverse embodiments of the disclosure described above may be stored in a non-transitory computer-readable medium. The computer instructions stored in the non-transitory computer-readable medium cause a specific device to perform the processing operations according to the diverse embodiments described above when they are executed by a processor of the specific device.

The non-transitory computer-readable medium is not a medium that stores data for a while, such as a register, a cache, a memory, or the like, but means a medium that semi-permanently stores data and is readable by the device. Specific examples of the non-transitory computer-readable medium may include a compact disc (CD), a digital versatile disc (DVD), a hard disk, a Blu-ray disc, a universal serial bus (USB), a memory card, a read only memory (ROM), and the like.

Meanwhile, the machine-readable storage medium may be provided in the form of non-transitory storage medium. Here, the term 'non-transitory storage medium' means that it does not contain a signal and is tangible, but does not distinguish between semi-permanent or temporary storage of data in the storage medium. For example, the 'non-transitory storage medium' may include a buffer in which the data is temporarily stored.

According to an embodiment, the methods according to the various embodiments disclosed in the disclosure may be included and provided in a computer program product. The computer program product may be traded as a product between a seller and a purchaser. The computer program product may be distributed in a form of the machine-readable storage medium (for example, a CD-ROM) that may be read by the machine, or distributed online (e.g., download or upload) through an application store (for example, PlayStore™) or directly between two user devices (e.g., smartphones). In the case of the online distribution, at least portions of the computer program products (e.g., downloadable app) may be at least temporarily stored or generated in the machine-readable storage medium such as a memory of a server of a manufacturer, a server of an application store or a relay server.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An apparatus comprising:
a communication interface with communication circuitry;
a memory configured to store at least one instruction; and
a processor,
wherein the processor is configured to:
receive, from an external device, a first audio, recognized as a wake up word by the external device,
receive, from the external device, second audio captured subsequent to the first audio, wherein the second audio includes a user voice subsequent to an operation performed by the external device based on recognition of the first audio as the wake up word,
analyze the first audio and the second audio so as to determine whether the first audio corresponds to the wake up word,
based on determining that the first audio does not correspond to the wake up word, obtain a neural network model trained to identify audio that corresponds to a misrecognized wake up word, and
transmit information regarding the neural network model to the external device so as to enable the external device to input the first audio to the neural network model and determine whether the first audio corresponds to the misrecognized wake up word based on output from the neural network model.

2. The apparatus of claim 1, wherein the processor is further configured to, based on a text corresponding to the first audio not being detected, determine that the first audio does not correspond to the wake up word.

3. The apparatus of claim 1, wherein the processor is further configured to:
obtain a text corresponding to the first audio; and
based on a similarity between the text corresponding to the first audio and the wake up word being less than a predetermined value, determine that the first audio does not correspond to the wake up word.

4. The apparatus of claim 1, wherein the processor is further configured to:
obtain a text corresponding to the second audio; and
based on the text corresponding to the second audio not having a predetermined sentence structure, determine that the first audio does not correspond to the wake up word.

5. The apparatus of in claim 1,
wherein the second audio includes a user voice regarding an operation performed as the external device recognizes the first audio as the wake up word, and wherein the processor is further configured to determine whether the first audio corresponds to the wake up word by analyzing the user voice.

6. The apparatus of claim 1, wherein the processor is further configured to determine whether the first audio corresponds to the wake up word based on a user feedback input through a user interface (UI) provided by the external device.

7. The apparatus of claim 1, wherein the processor is further configured to:
based on determining that the first audio does not correspond to the wake up word, store the first audio in the memory;
identify a plurality of third audios forming a cluster from among the first audio stored in the memory; and
train the neural network model based on the plurality of third audios.

8. A method of controlling an electronic apparatus, the method comprising:
receiving, from an external device, a first audio recognized as a wake up word by the external device;
receiving, from the external device, a second audio captured subsequent to the first audio, wherein the second audio includes a user voice subsequent to an operation performed by the external device based on recognition of the first audio as the wake up word;
analyzing the first audio and the second audio to determine whether the first audio corresponds to the wake up word;
based on determining that the first audio does not correspond to the wake up word, obtaining a neural network model trained to identify audio that corresponds to a misrecognized wake up word; and
transmitting information regarding the neural network model to the external device.

9. The method of claim 8, wherein the determining of whether the first audio corresponds to the wake up word comprises determining, based on a text corresponding to the first audio not being detected, that the first audio does not correspond to the wake up word.

10. The method of claim 8, wherein the determining of whether the first audio corresponds to the wake up word comprises:
obtaining a text corresponding to the first audio; and
based on a similarity between the text corresponding to the first audio and the wake up word being less than a predetermined value, determining that the first audio does not correspond to the wake up word.

11. The method of claim 8, wherein the determining of whether the first audio corresponds to the wake up word comprises:
obtaining a text corresponding to the second audio; and
based on the text corresponding to the second audio not having a predetermined sentence structure, determining that the first audio does not correspond to the wake up word.

12. The method of claim 8,
wherein the second audio includes a user voice regarding an operation performed as the external device recognizes the first audio as the wake up word, and
wherein the determining of whether the first audio corresponds to the wake up word comprises analyzing the user voice.

13. The method of claim 8, further comprising:
based on the first audio corresponding to the wake up word, obtaining a response corresponding to the second audio; and transmitting information regarding the obtained response to the external device.

14. The method of claim 8, further comprising:

determining whether the first audio corresponds to the wake up word based on a user feedback input through a user interface (UI) provided by the external device.

15. The method of claim 8, further comprising determining whether the first audio corresponds to the wake up word by determining whether the first audio corresponds to a misrecognition word using the neural network model.

16. The method of claim 8, wherein the information regarding the neural network model comprises at least one of parameters regarding the neural network model or a message requesting to download the neural network model.

\* \* \* \* \*